March 31, 1970   S. C. L. BOTCHERBY   3,503,682
OPTICAL MIXING DEVICES
Filed Jan. 9, 1967
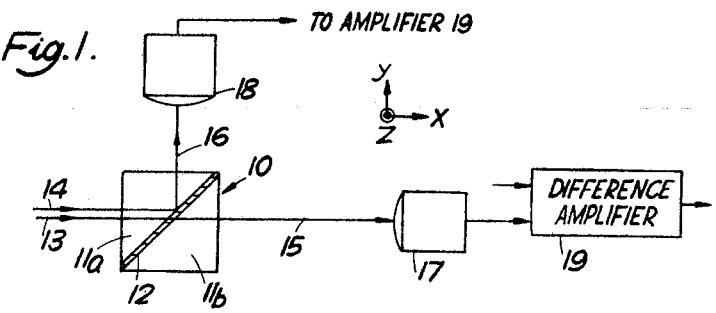
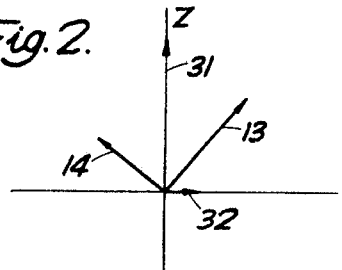
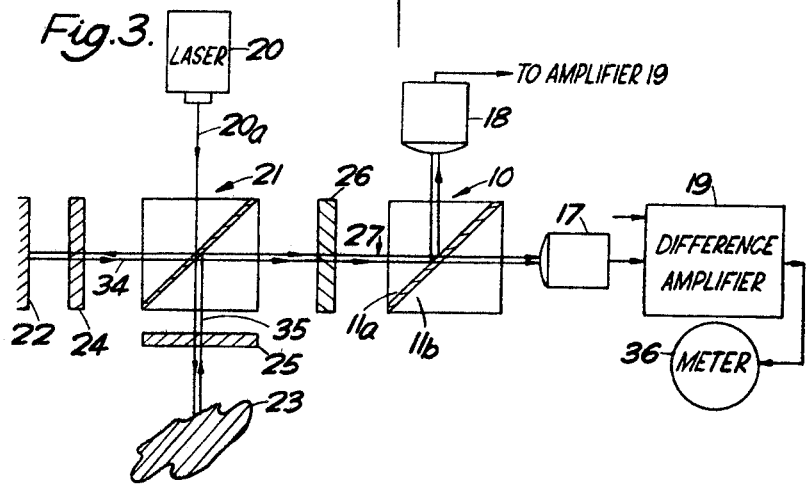

United States Patent Office 3,503,682
Patented Mar. 31, 1970

3,503,682
OPTICAL MIXING DEVICES
Stephen Charles Lauder Botcherby, London, England, assignor to Decca Limited, London, England, a British company
Filed Jan. 9, 1967, Ser. No. 608,042
Int. Cl. G01c 3/08
U.S. Cl. 356—4
7 Claims

ABSTRACT OF THE DISCLOSURE

The invention relates to the use of a polarisation beam splitter as an optical mixing device in which unwanted signals common to one of two incident beams are removed. The optical mixing device essentially comprises a polarisation beam splitter arranged to received the incident beams, which are adjusted to have different, preferably orthogonal, planes of polarisation. A substracting circuit responsive to the beams transmitted and deflected by the beam splitter extracts a wanted signal derived from both incident beams. A use with Doppler velocity measuring apparatus is described.

---

This invention relates to optical mixing devices and more particularly to balanced optical mixers for mixing optical signals such that unwanted components in one of the signals are reduced or eliminated.

The present invention utilises polarisation beam splitters, which may comprise a pair of 45° prisms arranged "back to back" with a multi layer, variable dielectric film between them and have the property that a beam of light directed at them (on to the interface between the prisms in the example given) separates into transmitted and deflected beams, the ratio therebetween corresponding to the ratio of the orthogonal components of polarisation of the incident beam.

According to the invention, an optical mixing device comprises means for directing two plane polarised light beams onto a polarisation beam splitter, the planes of polarisation of the two beams being such that components of both beams are present in the beams both transmitted and deflected by the polarisation beam splitter and means for subtracting signals derived from both the transmitted, and the deflected, beams.

The polarisation of the two incident plane polarised beams may be orthogonal and oriented with respect to the beam splitter so that, for each beam, there is approximate equality between the powers of the transmitted and deflected beams. Under these conditions, an unwanted frequency in one incident beam gives common mode signals of equal strength and the same phase in both the transmitted and the deflected beam, and may be removed when the derived signals are subtracted. Preferably the transmitted and deflected beams are directed towards photoelectric transducers so that a difference amplifier may be used to combine the derived signals.

This invention has particular application in optical Doppler velocity measuring apparatus and the like wherein, for example, light from a laser is directed on to a moving target and a receiver is arranged to receive light both directly from the laser and also reflected from the moving target to obtain a difference signal containing a Doppler shift component representative of the velocity of the moving target. Such apparatus is prone to the disadvantage of spurious frequencies generated by the laser masking the wanted Doppler component, and it is desirable to include means for providing some discrimination or rejection of the unwanted signals, so as to avoid for example using very expensive lasers, which do not suffer from the disadvantage of producing such spurious frequencies.

The invention may be more fully understood from the following description, during which reference will be made to the accompanying drawings, in which:

FIGURE 1 is a diagram illustrating an optical mixer;
FIGURE 2 is a phasor diagram; and
FIGURE 3 is a diagram illustrating the use of the optical mixer of FIGURE 1 in a Doppler velocity measuring apparatus.

In FIGURE 1, the polarisation beam splitter 10 comprises the two 45° right prisms 11a and 11b arranged "back to back" having a multi layer variable dielectric coating 12 therebetween to form a known type of polarisation beam splitter. Incident light beams 13 and 14 are directed in the positive $x$ direction (from left to right) at the beam splitter. If the beams 13 and 14 are polarised in, respectively, the $xy$ plane and the $xz$ plane (i.e. parallel to and perpendicular to the plane of the drawing) the beam 13 will be wholly transmitted in the direction indicated by ray 15 and the beam 14 will be wholly reflected in the direction of ray 16. However, in the present invention both rays are to provide transmitted and reflected components; this will occur if the polarisations of the beams are different from those already mentioned. Most suitable is to arrange for the polarisation of the incident beams to be rotated through 45° using for example, a "half-wave" plate so that the polarisation of the beams will be at $+45°$ and minus $45°$ to the $xz$ plane. Under these conditions, half of each incident beam is transmitted along direction of ray 15 and half deflected along the direction of ray 16.

When the transmitted and reflected components are converted to electrical signals by the photo electric transducers 17 and 18, the outputs of which are fed to the difference amplifier 19, signals which are obtained from optical frequencies present in only one of the incident beam will, since the beams have a polarisation of $+45°$ and $-45°$ to the $z$ axis, be equal and also in phase at the transducers 17, 18 and will therefore cancel when applied to the difference amplifier 19. If the beams were at any other angle, the obtained signals would be in phase but not equal in amplitude. On the other hand, signals which are obtained as the difference frequency between signals in the two incident beams will provide combined signals (e.g. the Doppler shift frequency), at the outputs of both transducers (which may be photo mixers) and these outputs will be out of phase, so that they will be added by the difference amplifier.

This effect may be more fully understood by reference to FIGURE 2 in which the input signals are represented by the phasors 13 and 14 respectively. The action of the beam splitter is the resolution of the inputs in two orthogonal directions corresponding to the polarisations of the transmitted and reflected components. This is represented in FIGURE 3 by the phasors 31 and 32 which are the sum and difference of the resolved components. It may be seen therefore, that at any time the resolved components of the difference signals (resulting from a difference in frequency of the phasors 13 and 14) will be complementary and thus out of phase, so that they will be added by the difference amplifier. On the other hand, a noise modulation on (or a spurious frequency in) one of the phasors only will cause corresponding modulations in the resolved components, 31 and 32 which modulations will be in phase. The corresponding outputs from transducers 17 and 18 will therefore be in phase and will tend to cancel at the difference amplifier. The usefulness of this will become more apparent with a consideration of FIGURE 3, which illustrates part of a Doppler velocity measuring apparatus.

The laser 20 directs light (denoted by the ray 20a) at the first polarisation beam splitter 21 (here being used as a duplexer) the light from the laser will be plane polarised at an arbitrary angle and there will be transmitted and deflected components from the splitter 21 directed at the mirror 22 and the moving target 23 through the quarter wave plates 24, 25 respectively. The polarisation of the reflected beam 23 will be rotated through a total of 90° by the quarter wave plate 24 so that, when it returns to the splitter 21 as beam 34 it will be wholly transmitted. The transmitted light striking the moving object 23 will be likewise rotated through a total of 90° by the quarter wave plate 25 and will be totally reflected when it returns, as ray 35, to the beam splitter 21. Accordingly, the output 27 from the duplexer comprises two orthogonally polarised components; the first component has come, in effect, directly from the laser and this contains the fundamental laser frequency and also the spurious frequencies which are generated; the second component contains the laser signals shifted in frequency in accordance with the velocity of the object 23.

The output signals 27 are applied to the beam splitter 10, having first been rotated by the half wave plate 26 to have a polarisation in the yz plane at 45° to the z axis. Accordingly, the Doppler frequency signals which are obtained at the outputs of the photoelectric transducers 17, 18 are out of phase and are added by the difference amplifiers 19. However, the spurious laser frequencies and the modulation products obtained between them and the laser signal are of equal amplitude and are in phase (since they are obtained from one input signal only, whereas the Doppler signals must be obtained by subtraction by the photo mixers between both input signals) when applied to the difference amplifier. They are therefore removed by subtraction, leaving only the Doppler shift signal which may be used in a suitable tracking circuit to obtain the velocity of the moving target. In FIGURE 3, the output from the difference amplifier 19 is shown simply as being fed to any suitable frequency meter 36 calibrated in units of velocity so that the velocity of the moving object 23, or at least the component of its velocity towards or away from the laser, may be indicated directly. Other uses of the Doppler shift signal, such as using it to control the velocity of the moving object, may of course be made.

It will be understood that the term "light" in this invention is intended to include all frequencies which may be suitable for the beam splitter. Such a range may include infrared and ultraviolet frequencies, which would render the invention suitable for use with lasers producing corresponding frequencies.

I claim:

1. An optical mixing device comprising a polarisation beam splitter, means for directing in the same direction two plane polarised light beams on to the polarisation beam splitter, the planes of polarisation of the two beams being such that components of both beams are present in the beams both transmitted and deflected by the polarisation beam splitter, first and second photo-electric transducers for converting the transmitted and deflected beams respectively into corresponding electric current signals, and means for subtracting said electric current signals.

2. A device according to claim 1 wherein the polarisations of said plane polarised beams are orthogonal and oriented with respect to the polarisation beam splitter such that there is approximate equality between the powers of the transmitted and deflected beams.

3. A device according to claim 1 wherein said means for subtracting comprises a difference amplifier arranged to receive the electric current signals from said transducers.

4. A device according to claim 1 wherein there are provided means for adjusting the polarisation of said two plane polarised beams.

5. A device according to claim 4 wherein the means for adjusting the polarisation of said plane polarised beams comprises a quarter-wave plate.

6. Doppler velocity measuring apparatus comprising:
a coherent light source, said coherent light source producing a coherent light beam;
directing means directing said coherent light beam onto a moving object;
light directing means receiving light beams directly from the coherent light source after reflection from the moving object;
a polarisation beam splitter;
said light directing means being arranged to direct the light beams in the same direction onto said polarisation beam splitter with orthogonal planes of polarisation, said polarisation beam splitter splitting said light beams into transmitted and deflected beams;
a pair of transducing means receiving respectively said transmitted beam and said deflected beams and converting said beams into respective electrical signals; and
subtracting means subtracting said electrical signals to produce an output representing the velocity of said moving object.

7. Apparatus according to claim 6 wherein there is provided means responsive to the output of said subtracting means for indicating the velocity of said moving object.

References Cited

UNITED STATES PATENTS

| | | | |
|---|---|---|---|
| 2,854,883 | 10/1958 | Jones et al. | 356—115 |
| 2,861,493 | 11/1958 | Landegren | 356—116 |
| 3,049,703 | 8/1962 | Davis | 343—100 XR |
| 3,177,761 | 4/1965 | Redner | 356—115 |
| 3,224,002 | 12/1965 | Carre | 343—100 XR |
| 3,409,369 | 11/1968 | Bickel | 356—28 |

RICHARD A. FARLEY, Primary Examiner

JEFFREY P. MORRIS, Assistant Examiner

U.S. Cl. X.R.

356—114